Patented June 8, 1948

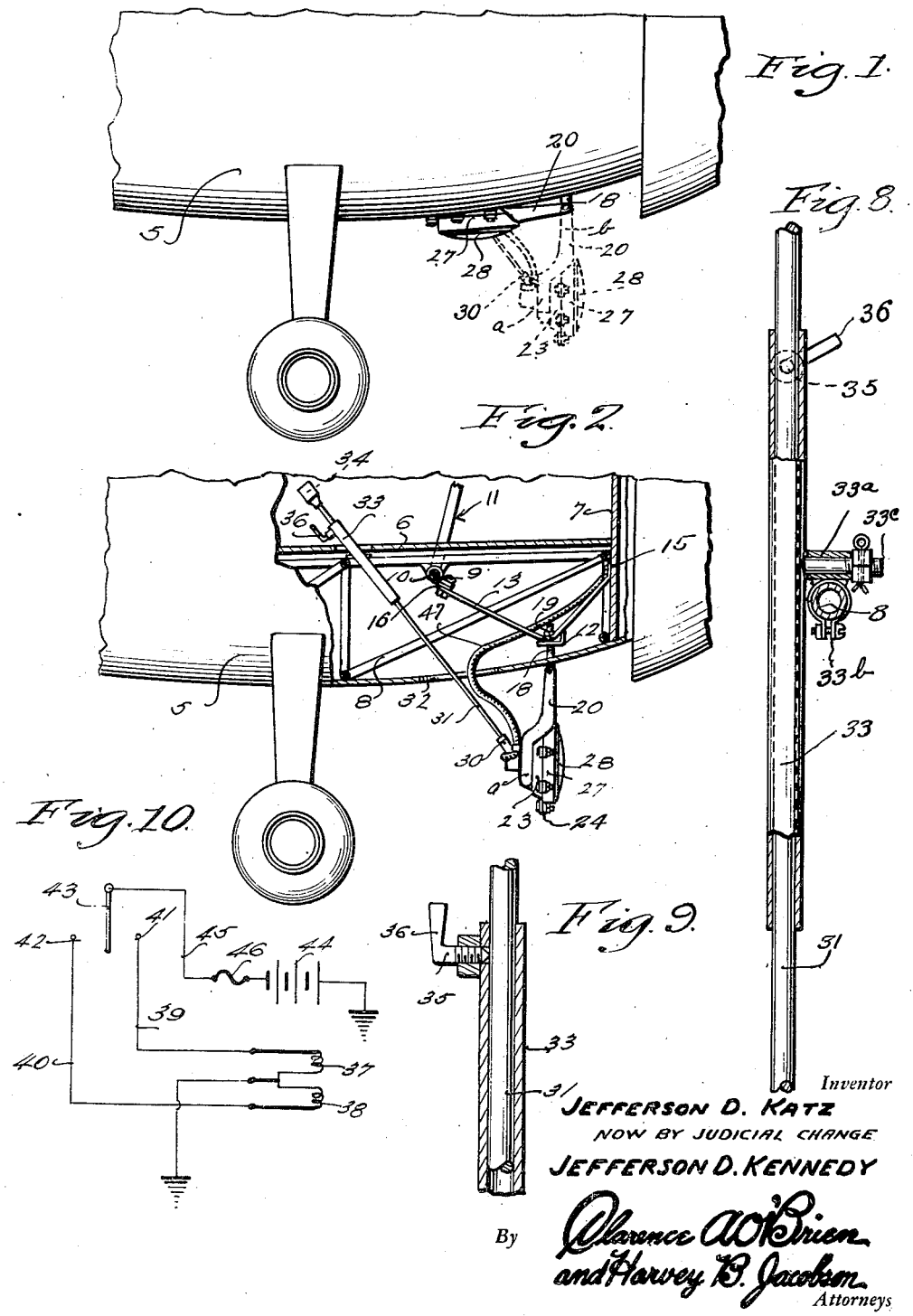

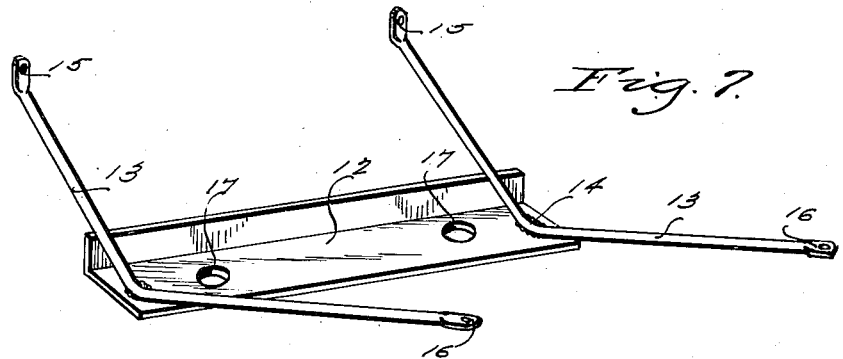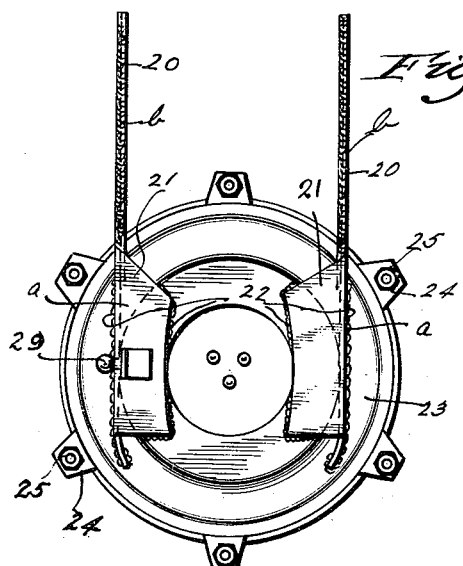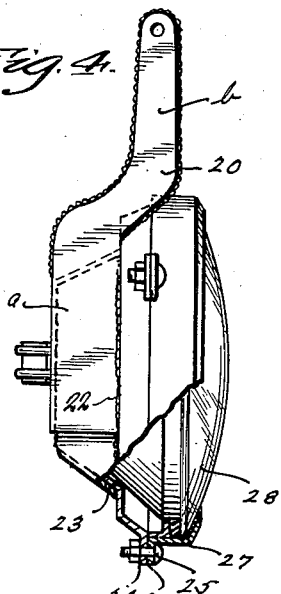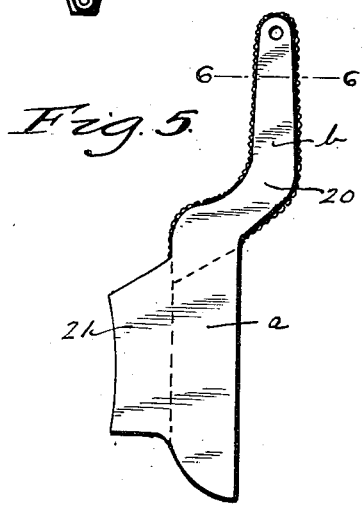

2,443,007

UNITED STATES PATENT OFFICE 2,443,007

AIRCRAFT LANDING AND TAXIING LIGHT

Jefferson D. Katz, Baltimore, Md., now by judicial change of name Jefferson Davis Kennedy Application August 15, 1944, Serial No. 549,574

5 Claims. (Cl. 240—7.7)

This invention relates to new and useful improvements in a novel, auxiliary projectable and retractable landing and taxiing light for aircraft.

The principal object of the present invention is to provide a light of the character stated which is adapted for location under the belly of an aircraft fuselage where it can be readily controlled and swung "in" or "out" by the pilot.

Another important object of the invention is to provide an adjustable aircraft landing and taxiing light which can be easily and safely adjusted by the pilot without interfering with his expedient control of the aircraft.

Still another important object of the invention is to provide an aircraft landing and taxiing light which is reliably and sturdily supported from the existing or stock structural elements of the fuselage without the inclusion of any weight adding complicated anchoring or brace means, or cumbersome operating and controlling devices.

Another object of the invention has to do with a novel receding landing and taxiing lamp which when in normal flying position recedes into an opening provided therefor in the belly of the fuselage of the aircraft, the lamp being hingedly and swingably mounted in place and swingable through a predetermined arc from a horizontal position to a substantially vertical position for landing purposes, operating means being provided on the interior of the fuselage and said means being conveniently accessible to the pilot, and the location of said lamp being such as to prevent light glare from reaching the pilot's eyes, thus insuring reliable and efficient vision in landing and taxiing operations.

Other objects and advantages of the invention will become apparent to the reader of the following description.

In the drawings—

Figure 1 is a fragmentary side elevational view of the fuselage of an aircraft showing, in full lines the auxiliary landing light in retracted flying position and, in dotted lines, projected to an extended landing position.

Figure 2 is a fragmentary side elevational view with a portion of the fuselage broken away to disclose the hanger and control means for said light.

Figure 3 is a rear elevational view of the hanger bracket-equipped light structure by itself.

Figure 4 is a side elevational view of the light structure with a portion of the rim and case broken away.

Figure 5 is a side elevational view of one of the hanger brackets or arms.

Figure 6 is a cross-section taken on the line 6—6 of Figure 5.

Figure 7 is a perspective view of the hanger unit for the light structure.

Figure 8 is a fragmentary sectional and elevational view through the light-operating control rod and barrel mounting arrangement.

Figure 9 is an enlarged fragmentary detailed sectional view showing a detent on the barrel for the reciprocatory control rod.

Figure 10 is a diagrammatic view showing the electrical connections between the electrical elements involved.

Referring to the drawings, wherein like numerals are employed to designate like parts throughout the views, it will be observed that the numeral 5 denotes, generally speaking, the fuselage of a conventional aircraft. As particularly detailed in Figure 2, the numeral 6 designates the floor and 7 the fire wall which is at the forward end of said floor. The horizontal rod structure between the floor and belly of the fuselage, that is, the structure comprising the horizontal, vertical and diagonal rods is generally denoted by the numeral 8, this being the customary or usual structural tubing forming the frame work on the interior of the fuselage. Numeral 9 designates the usual aircraft control shaft, that is, a horizontal shaft, this being pivotally supported for oscillation in brackets 10 and operated or oscillated by the control rod 11. These conventional parts are shown and described merely to bring out the fact that the invention, which is in the nature of an attachment applicable to said conventional parts, has various portions thereof associated with said novel parts.

Considering now the device disclosed in perspective in Figure 7, this is a conventional hanger unit. It comprises a horizontal plate 12 substantially L-shaped in cross-sectional form. V-shaped hanger rods 13 have their intermediate portions 14 welded to the end portions of the horizontal flange of said plate 12 and the free outer ends 15 and 16 are flattened and suitably bent and shaped to permit them to be conveniently anchored on the stock parts in the fuselage, as brought out to advantage in Figure 2. That is to say, the forward rod-ends 15 are preferably attached to the fire wall 7, although they can be connected to any one of the rods in the framework structure 8, as is obvious. The opposite rod-ends as at 16, are secured by brackets or the like to the aforementioned oscillatory rod 9. However, these ends 16 can be otherwise fashioned and arranged for anchorage on any of the rods in the framework structure 8. The main idea here is to provide suitable anchorage points for the ends 15 and 16, whereby to thus support the plate 12 in a suitable position. It will be noticed in Figure 7 that this plate is provided with bolt holes 17 and that bolts extend upwardly through the holes, the bolts being assembled and maintained in place by retention nuts, as brought out in Figure 2 of the drawings. The lower ends of said hanger bolts 18 project downwardly through and slightly beyond the belly of the fuselage, as shown in Figures 1 and 2, where they serve to accommodate the projectable and retractable safety light and parts directly associated therewith. The parts referred to constitute bracket arms 20 of the shape and configuration brought out in Figures 3, 4, and 5, particularly Figure 5. The upper ends of these arms are pivotally connected to the protruding lower ends of the bolts 18 to provide the desired hinging effect. With reference to Figure 4, it will be seen that the body portions of said arms, indicated at a, are welded at 22 on the diametrically opposite sides of a shell-like casing 23. The upper ends of these arms are laminated or made up of several plies welded or otherwise secured together for convenience and rigidity in construction.

As illustrated to advantage in Figure 5, the body portions a of said arms are provided with outstanding bendable flanges 21. These flanges bend at right angles to said portions a and are welded, as at 22, to the rear disk-like or annular part of the casing 23, as evident in Figure 3. The marginal edge portion of said casing 23 is provided with circumferentially spaced, outstanding ears or lugs 24 bolted, as at 25, to complemental ears 26 on the annular rim 27, this being shaped to embrace the marginal or perimeter portion of the sealed beam lamp or light unit 28. See Figure 4.)

Secured to one of the wings or flanges 21 (see Figure 3) is a bracket carrying a ball joint element 29 which engages in the socket 30 (see Figure 2) from which extends a shifter rod 31, the latter operating slidably through a seating and adapter opening 32 in the belly of the fuselage 5.

Reference being had now to Figures 8 and 9, it will be noticed that this rod 31 shifts or slides back and forth in a sleeve-like barrel or tube 33, the latter being rockably mounted in an opening in the floor, as disclosed. As shown to the right in Figure 8, the central portion of this sleeve is provided with a right-angularly extending bearing 33a carrying a split clamp 33b, which clamp is rockably or pivotally mounted on an adjacent one of the rods in the frame structure 8. More specifically, the clamp 33b surrounds the adjacent rod 8 and carries the bearing 33a. The sleeve 33 has a journal pin or stud 33c rockable in said bearing 33a and held in place by an assembling nut. Of course, in actual practice, any suitable means may be employed to rockably support the guide barrel 33. As previously stated, the lower end of the rod 31 is connected by ball and socket joint to the projectable and retractable light unit. The upper end extends through and beyond the barrel and is provided with an appropriate hand grip 34 located within a safe range for convenient operation by the pilot. A set-screw 35 is mounted on the upper end of the barrel 33, as shown in Figure 9, and this is provided with a convenient operating handle 36.

The sealed beam unit 28 includes high and low beam filaments 37, 38, these filaments having conductors 39, 40 extending to contacts 41, 42, respectively, against which a contactor 43 is selectively engageable.

A source of current such as a battery 44 has a lead 45 to the switch contactor 43 and in this is preferably a fuse 46.

Obviously, apart from the adjustability of the light by the rod 31, adjustment may take place by simply switching the filaments 37 and 38 on from one to the other as found desirable.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. In a structural arrangement of the class described, in combination, an airplane fuselage, a pair of substantially parallel hanger members confined and mounted within said fuselage, a plate connected to and supported from said hanger members, said plate being horizontally disposed, hinge bolts attached to said plate, a projectible and retractible safety landing and taxiing light unit, a casing structure in which said light unit is housed and mounted, a pair of diametrically opposite brackets attached to said casing structure and having their upper ends hingedly connected to said hinge bolts, and manually controllable mechanical means arranged for handling in access in the cockpit of said fuselage and connected to said casing structure to retract and project the latter in relation to said fuselage.

2. In a structural arrangement of the class described, in combination, an airplane fuselage, a pair of substantially V-shaped hanger members mounted therein, a plate connected to and supported from said hanger members, said plate being horizontally disposed, suspending and hinging bolts attached to said plate, an auxiliary safety landing light unit, a casing structure in which said light unit is mounted, a pair of diametrically opposite brackets attached to said casing structure and having their upper ends hingedly connected to said bolts, a rockably mounted barrel constituting a guide, a rod slidably mounted in said barrel and provided on its upper end with an operating handle, and a ball and socket connection between the lower end of said rod and said casing.

3. In an airplane, a hanger member, a lamp supporting casing having pivotal connection with the hanger, an inclined actuating rod for the casing, a pivotal and hinged connection between the casing and said rod, said hanger being rigidly supported within a fuselage, means connected to the hanger projecting below the fuselage wall to which the casing is swingably and vertically suspended, a pivoted tubular member depending and projecting through and beyond the floor of the airplane and through which said rod is slidable, and means for fixedly securing the rod relative to said tubular member.

4. In an airplane, a hanger member, a lamp supporting casing having pivotal connection with the hanger, an inclined actuating rod for the casing, an operating connection between the casing and said rod, said hanger being rigidly supported within a fuselage, means connected to the hanger projecting below the fuselage wall to which the casing is pivoted, a pivoted tubular member projecting through the floor of the airplane through which said rod projects, means for fixedly securing the rod relative to said tubular member, and said rod being manually controlled and adapted to selectively position and hold the lamp case at any angle from vertical to horizontal.

5. In a safety aircraft landing and taxiing lamp construction of the class described, in combination, an airplane fuselage having a safety landing lamp accommodation opening in its belly portion and inwardly of its forward nose portion, a horizontal hangerplate on the interior of said fuselage and above and in proximity to said opening, fixed means suspending and holding said plate in a prescribed position, a receding type projectible and retractible taxiing and landing lamp structure adapted to lodge itself, when in receding flying position, in said opening, and swingable downwardly and forwardly to varying angular landing positions, arm means secured rigidly to said lamp structure, means hingedly connecting the arm means with said plate, and a rod hingedly joined at its lower end to said lamp structure and inclining and working back and forth by way of said opening, the upper end of said rod projecting into the fuselage for access and convenient operation by the pilot.

JEFFERSON D. KATZ.

REFERENCES CITED

The following references are of record in the file of this patent:

UNITED STATES PATENTS

| Number | Name | Date |
|---|---|---|
| 1,787,823 | Hyatt | Jan. 6, 1931 |
| 1,875,607 | Hummert | Sept. 6, 1932 |
| 1,985,611 | Lemm | Dec. 25, 1934 |
| 2,148,198 | Harley | Feb. 21, 1939 |
| 2,362,110 | Meyerhofer | Nov. 7, 1944 |